Sept. 9, 1952
C. E. TORSCH
AUDIO-POWER SWITCHING SYSTEM FOR RADIO TELEVISION RECEIVER COMBINATIONS
Filed July 21, 1948
2,610,251
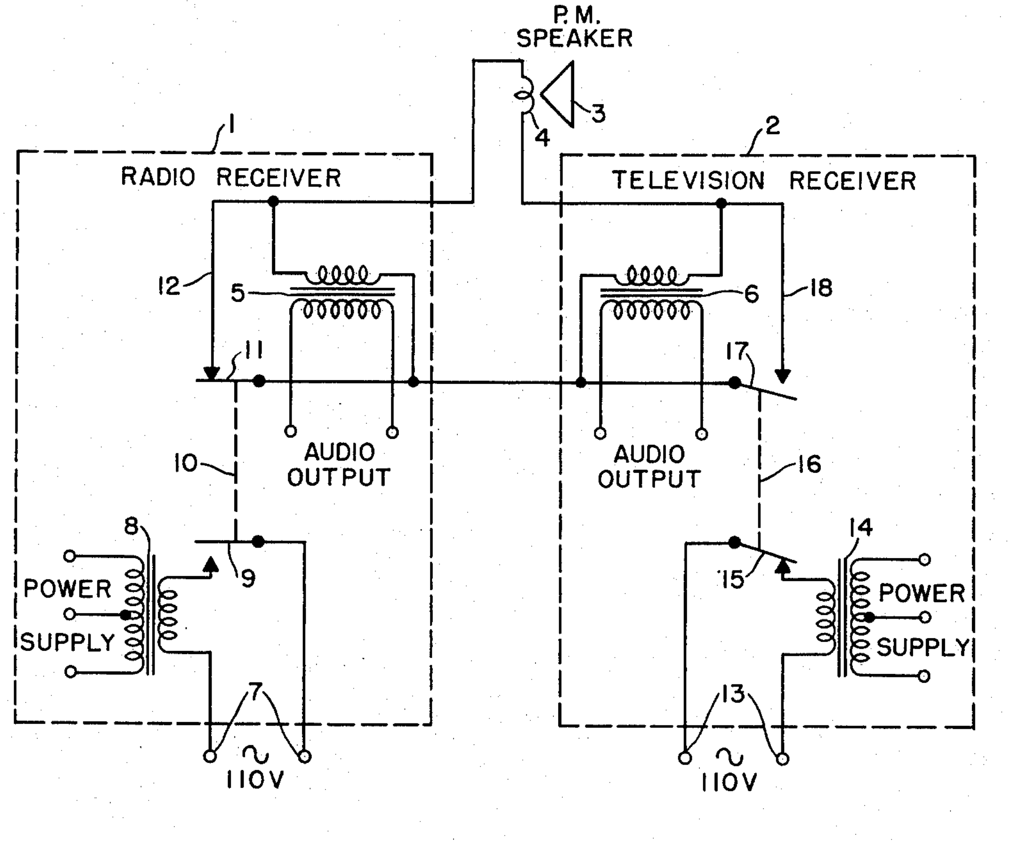
CHARLES E. TORSCH
Inventor
By Killman and Kerst
Attorney Patented Sept. 9, 1952 2,610,251

UNITED STATES PATENT OFFICE 2,610,251

AUDIO-POWER SWITCHING SYSTEM FOR RADIO-TELEVISION RECEIVER COMBINATIONS

Charles E. Torsch, Towson, Md., assignor to Bendix Aviation Corporation, Towson, Md., a corporation of Delaware Application July 21, 1948, Serial No. 39,923

2 Claims. (Cl. 179—1)

This invention relates to radio-television receiver systems and more particularly to an arrangement providing for the use of a single loud speaker for such combinations.

Radio and television receivers are often incorporated into the same cabinet or sold as companion pieces to be located in side-by-side arrangement. In such cases a separate loud speaker for each receiver has sometimes been used but economy dictates the use of a single loud speaker for both units.

Attempts have been made to utilize a single loud speaker by connecting the secondaries of the audio output transformers in parallel with the voice coil. This solution to the problem involved the use of a disabling switch in series with each output secondary, the switch of each receiver being interlocked with the power switch of the other receiver so that when the power circuit of one receiver was completed the output circuit of the other receiver would be disabled.

This arrangement was subject to the defect that the switch contacts introduce a relatively high impedance into a series circuit which otherwise is of a low impedance nature. As the contacts wear this high impedance becomes variable resulting in loss of output and distortion.

It is an object of this invention to provide an arrangement by means of which a single loud speaker may be employed for a pair of receivers without introducing distortion and losses into the output circuits.

It is another object of the invention to provide in an audio output circuit common to a pair of receivers means effectively decoupling said output circuit from the audio channel of each of said receivers as that receiver is deenergized and coupling said circuit to the audio channel of each of said receivers as it is energized.

The objects and advantages of the invention are realized by an arrangement in which the secondaries of the audio output transformers are connected in series with the voice coil, and each secondary is provided with a shorting switch ganged with the power supply switch of its respective receiver in a manner such that the secondary is shorted when its receiver is turned off.

Other objects and advantages will become apparent from a consideration of the following description taken together with the accompanying drawing, the single figure of which is a schematic circuit diagram of an arrangement embodying the invention.

In the drawing a radio receiver 1 and a television receiver 2 are represented by dashed boxes. A common loud speaker 3 is shown with a voice coil 4, the speaker being indicated as of the permanent magnet type. The secondaries of the audio output transformer 5 of the radio receiver and the audio output transformer 6 of the television receiver are connected in series with the voice coil 4.

The radio receiver is provided with terminals 7 which connect to voltage supply mains such as a domestic lighting supply source. These terminals are connected in a series circuit with the secondary of the power supply transformer 8 of the radio receiver and a switch 9. The switch 9 is ganged mechanically as indicated at 10 with a switch 11 forming a portion of a conductor 12 which acts when the switch 11 is closed to short circuit the secondary of transformer 5. The switches 9 and 11 are so connected that the closing of one opens the other.

The television receiver is provided with an identical arrangement. The power terminals 13 are in series with the secondary of power supply transformer 14 and a switch 15. The latter is ganged mechanically as shown at 16 with a switch 17 which interrupts a conductor 18 shunting the secondary of the output transformer 6. The closing of one of these switches opens the other.

The operation of this arrangement is believed to be obvious. When either receiver is disconnected from its power source, the secondary of its output transformer is short circuited. When it is connected to its power source the short circuit is removed.

If desired, the primaries, rather than the secondaries of the output transformers, may be shorted. This will provide more positive action in a circuit of higher impedance.

It can be seen that the invention provides a means for utilizing a single loud speaker for a pair of receivers without the use of series contacts in the output circuit, and yet without losses due to the coupling of the output circuit to the audio circuits of the receiver which is not in use.

What is claimed is:

1. A switching system for use in a pair of receivers of electro-magnetic waves, each having a power supply circuit and an audio output transformer, said system comprising a loud speaker having a voice coil, means serially connecting said voice coil and the secondaries of said audio output transformers, a pair of ganged switches in each receiver and means whereby each of said pairs of ganged switches is operable to short circuit the secondary of the output transformer of its respective receiver when the power supply circuit of said receiver is interrupted and to interrupt said short circuit when said power supply circuit is completed.

2. A switching system for use in a pair of receivers of electro-magnetic waves, each having a power supply circuit and an audio output transformer, said system comprising in each receiver a conductor shunting the secondary winding of the transformer of that receiver and a switching means, said switching means comprising a switch in said conductor and a switch in said power supply circuit, said switches being so ganged that the opening of each closes the other, and means whereby said switching means are operable in one position to simultaneously interrupt said conductor and complete said power supply circuit, and operable in a second position to simultaneously complete said conductor and interrupt said power supply circuit, a loud speaker having a voice coil, and means conductively and serially connecting said voice coil and the said secondary windings.

CHARLES E. TORSCH.

REFERENCES CITED

The following references are of record in the file of this patent:

UNITED STATES PATENTS

| Number | Name | Date |
|---|---|---|
| 1,892,935 | De Forest | Jan. 3, 1933 |
| 1,946,565 | Baumann | Feb. 13, 1934 |
| 2,068,002 | Batchelor | Jan. 17, 1937 |
| 2,140,032 | Sears | Dec. 13, 1938 |
| 2,165,794 | Holmes | July 11, 1939 |
| 2,297,205 | Deserno | Sept. 29, 1942 |
| 2,323,858 | Upton | July 6, 1943 |
| 2,491,808 | Fyler | Dec. 20, 1949 |

OTHER REFERENCES

"Radio Craft," August 1940, page 74 (Stromberg-Carlson No. 435).

"Rider's Television Manual," vol. #1, Andrea TV, pp. 1–17; 1–45; 1–49, 50, copyright 1948.

"Dumont Service Manual," for Model RA-101, by Allen B. Dumont Laboratories, copyright 1947, pp. 3, 4, 5, 6, 7, 25, 26, 27.